United States Patent
Haggard et al.

(10) Patent No.: US 9,861,912 B2
(45) Date of Patent: Jan. 9, 2018

(54) RAPID SLUDGE REMOVAL CLARIFIER

(71) Applicant: Ovivo Inc., Montreal (CA)

(72) Inventors: Gary D. Haggard, Lakeway, TX (US); Jeffrey C. Kauppila, Georgetown, TX (US)

(73) Assignee: Ovivo Inc., Montreal (CA)

( * ) Notice: Subject to any disclaimer, the term of this patent is extended or adjusted under 35 U.S.C. 154(b) by 78 days.

(21) Appl. No.: 15/158,176

(22) Filed: May 18, 2016

(65) Prior Publication Data
US 2017/0333813 A1 Nov. 23, 2017

(51) Int. Cl.
*B01D 21/18* (2006.01)
*B01D 21/24* (2006.01)
*B01D 21/06* (2006.01)

(52) U.S. Cl.
CPC .......... *B01D 21/245* (2013.01); *B01D 21/06* (2013.01); *B01D 21/18* (2013.01); *B01D 21/183* (2013.01)

(58) Field of Classification Search
CPC .... B01D 21/0006; B01D 21/06; B01D 21/14; B01D 21/18; B01D 21/183; B01D 21/245
USPC ................................. 210/528, 803
See application file for complete search history.

(56) References Cited

U.S. PATENT DOCUMENTS

| | | | | |
|---|---|---|---|---|
| 2,122,385 A * | 6/1938 | Scott | ...................... | B01D 21/06 |
| | | | | 210/528 |
| 2,126,884 A * | 8/1938 | Hardinge | ............... | B01D 21/06 |
| | | | | 210/528 |
| 2,236,434 A * | 3/1941 | Knowles | ............... | B01D 21/245 |
| | | | | 210/528 |
| 2,922,524 A * | 1/1960 | Rankin | .................. | B01D 21/06 |
| | | | | 210/528 |
| 3,349,030 A * | 10/1967 | Savage | .................. | B01D 21/06 |
| | | | | 210/528 |
| 3,371,788 A * | 3/1968 | Smith | ..................... | B01D 21/18 |
| | | | | 210/528 |
| 3,494,462 A * | 2/1970 | Baud | ..................... | B01D 21/245 |
| | | | | 210/528 |
| 3,722,698 A * | 3/1973 | Hampton | ............... | B01D 21/18 |
| | | | | 210/528 |
| 3,800,955 A * | 4/1974 | Edgerton | ............... | B01D 21/06 |
| | | | | 210/528 |
| 5,830,356 A * | 11/1998 | Kauppila | ............... | B01D 21/06 |
| | | | | 210/528 |

FOREIGN PATENT DOCUMENTS

DE 3715021 * 11/1988

* cited by examiner

*Primary Examiner* — Christopher Upton
(74) *Attorney, Agent, or Firm* — Thomas M. Freiburger

(57) ABSTRACT

Rapid removal of settled solids in secondary clarifiers is critical in sewage treatment plants having nutrient removal permits, especially phosphorus, to prevent solids from surfacing after going aerobic and releasing phosphorus. Release of phosphorus could impact the plant's permit limit. This is addressed by the described design of rake blade flights and squeegees that quickly move solids on the clarifier floor to the sludge pickup tubes, usually in one revolution. In a preferred form the blade flights are curved and may be spiral in shape, causing gathered sludge to advance outwardly toward the pickup tube at each flight, usually in one revolution. Previous blade flights included angled linear sections that progressively move the sludge in incremental movements with each revolution of the clarifier mechanism.

4 Claims, 3 Drawing Sheets

RAPID SLUDGE REMOVAL CLARIFIER

BACKGROUND OF THE INVENTION

This invention is concerned with wastewater treatment plants, particularly with secondary clarifiers and with removal of settled solids via rake arms operating along the bottom of the clarifier.

In a sewage treatment plant, the rate of removal of settled solids in secondary clarifiers can be critical. Most plants have nutrient removal permits, especially regarding phosphorus. The rate of removal of the solids in such plants is important. Settled solids should be removed quickly to prevent them from surfacing after going anaerobic and releasing phosphorus into the wastewater, which can impact the phosphorus permit limit for the plant.

Most conventional clarifier sludge rake arms have blade flights and squeegees, designed to travel along the floor, with a design configuration that can require two or three rake arm revolutions to cause migration of engaged sludge outwardly to a point of removal at a sludge pickup tube. Such pickup tubes draw the sludge upwardly to a elevated sludge return box in a hydraulic differential sludge removal clarifier. If settled sludge in the clarifier basin dwells in the basin too long, anaerobic conditions are created in the sludge blanket, resulting in release of phosphorus into the wastewater rather than removal of the phosphorus from the basin, as noted above. The phosphorus can then float to the surface of the clarifier and potentially exit the clarifier over the influent weirs. As explained above, this can impact the phosphorus permit limit of the treatment plant. Extremely important in plants with strict nutrient limits, this applies as well to and is useful in all secondary clarifiers in municipal wastewater treatment plants.

A typical prior art conventional clarifier sludge removal system included rake arms with blade flights and attached squeegees of straight configuration, mounted at oblique angles to the length of the rake arm. A series of three or four of these are arranged parallel to one another, spaced apart so as to act as a comb, simply pushing or urging the settled sludge outwardly in the clarifier by an incremental distance with each revolution. In this way, sludge moved by a flight in one pass is engaged by a farther-out flight in the next pass of a rake arm (which will be the opposing arm). If four blade flights were positioned between the clarifier center and a sludge pickup tube, then in theory at least four rake arm passes (at least two full revolutions) would be required to move the innermost sludge to the position of the pickup tube. At the pickup tube would be a pair of such flights in a V-formation with the open end forward, tending to collect sludge that has been fed out to that distance from center. Several series of such obliquely angled flights have typically been included on a rake arm, one for each pickup tube location.

As noted above, the requirement of two or three revolutions of the slowly moving rake arms can be objectionable when the plant is limited as to phosphorus discharged in the effluent water from the plant. The objective of the invention is to reduce the number of rotations of the rake arm to bring sludge to pickup points and thus to reduce the dwell time of settled sludge within the clarifier.

SUMMARY OF THE INVENTION

The invention achieves this objective by design geometry of blade flights and attached squeegees on the rake arm.

In preferred embodiments of the invention as described below, clarifier rake blade flights and attached squeegees are non-linear and shaped to induce the flow of sludge to the pickup tubes quickly, usually within a single rotation of the rake arm. For example, in a clarifier of 60-foot diameter, if two pickup tubes are included along the length of each rake arm, one blade flight of the invention can be provided for each, feeding the sludge to that pickup point without the need for "combing" the sludge incrementally along the floor a relatively short distance with each pass of the rake.

The continuous blade flights of the invention are curved, forming a concave shape facing forwardly, and can be arcuate or spiral, with varying radius along the length of the curve. As the rake arm rotates, the configuration of the continuous blade flights makes the movement of solids to the pickup tubes much quicker and more efficient, eliminating the potential issue of phosphorus being released if septic conditions exist and anaerobic sludge is formed.

It is thus a main object of the invention to provide continuous blade flights on the rake arms of a clarifier so as to move sludge to a pickup point more quickly and efficiently as the rake arm rotates. This and other objects, advantages and features of the invention will be apparent from the following description of a preferred embodiment, considered along with the accompanying drawings.

DESCRIPTION OF PREFERRED EMBODIMENTS

Figure 1:
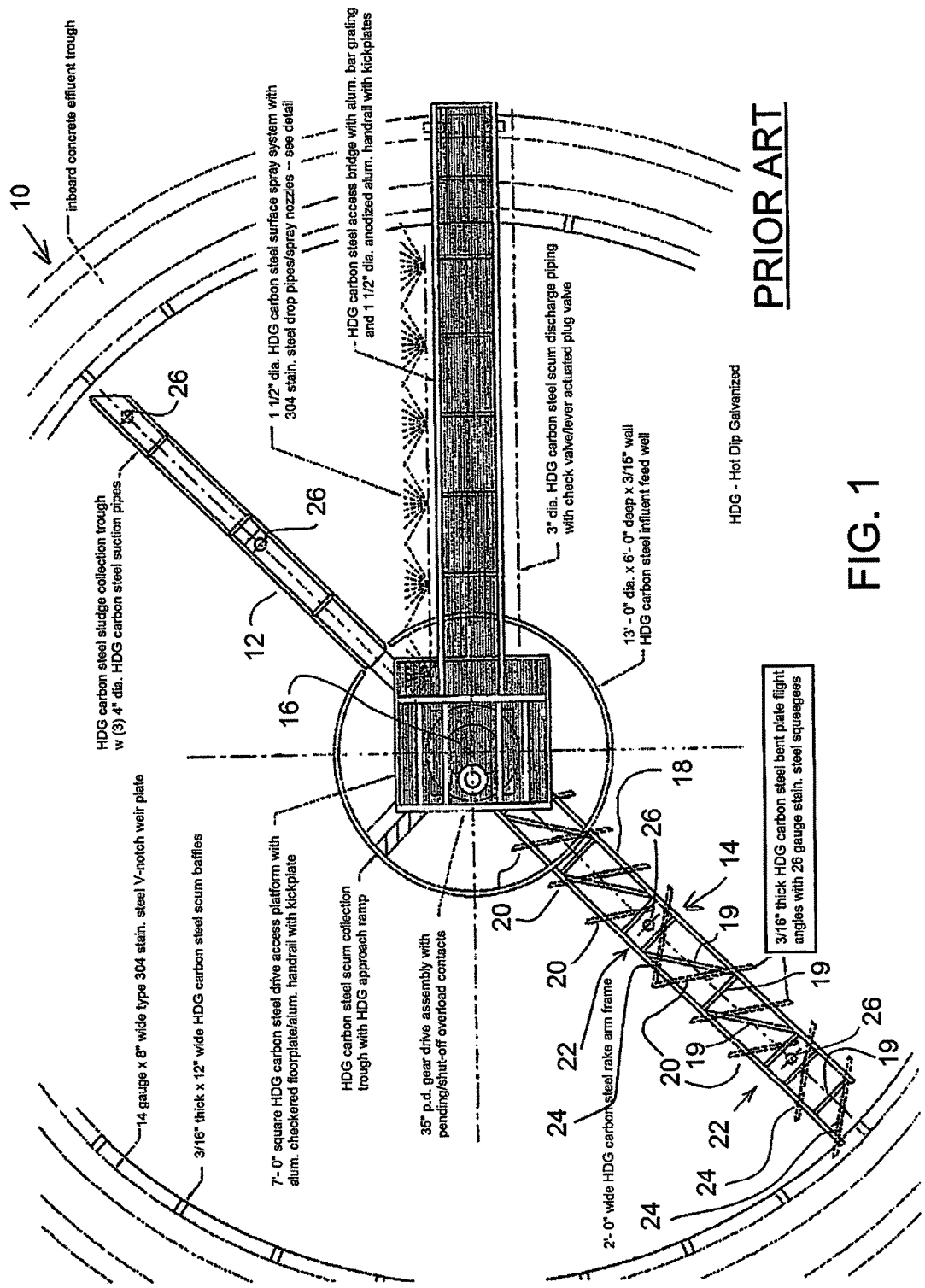
FIG. 1 is a plan view showing a conventional system of blade flights on the rake arm of a clarifier in accordance with the prior art.

In the drawings, FIG. 1 shows in plan view a portion of a secondary clarifier 10 forming a part of a sewage treatment plant. The prior art system depicted in FIG. 1 has rake arms 12 and 14 of conventional design. The rake arm 12 is similar to its counterpart 14, even though not shown in detail in these drawings.

As is well known, the rake arms are driven about a central axis 16 of the clarifier, sweeping slowly over the floor of the tank. The drawing shows a typical current design, the rake arms having structural members 18 and 19 for rigidity and carrying straight blade flights 20 arranged in parallel, spaced relationship on the rake arms as shown, each having a squeegee at bottom. The flights are obliquely angled as shown, approximately 15° to 20° from the path they follow. The drawing shows two such primary series of blade flights 20, both leading to a V-plow 22 formed in between the blade flight 20 and oppositely-angled blade flight 24. A pickup tube 26 is at this location defined by the V-plow, so that settled solids in a thickened sludge are withdrawn from these locations. As shown in FIG. 1, the rake arm may have an outermost blade flight 24 at the same angle as the blade flights 24 that form the outer side of the V-plows. Inclusion of this outermost blade flight 24 depends on the location of the pickup tube 26.

As explained above, the rake arms with the conventional series of straight flights slowly comb the settled solids radially outwardly toward the pickup tube locations. Each blade flight 20 urges sludge to move outwardly essentially to the position of the next flight 20, so that the next pass of a rake arm, which will be the opposing rake arm 12, can move this portion of sludge incrementally farther outward. Such a system might require two or three full revolutions of the clarifier mechanism and rake arms before settled solids close to the center of the clarifier are brought to a pickup tube. This long dwell time of settled sludge can present a serious problem relating to phosphorus discharge, for the reasons outlined above.

Figure 2:
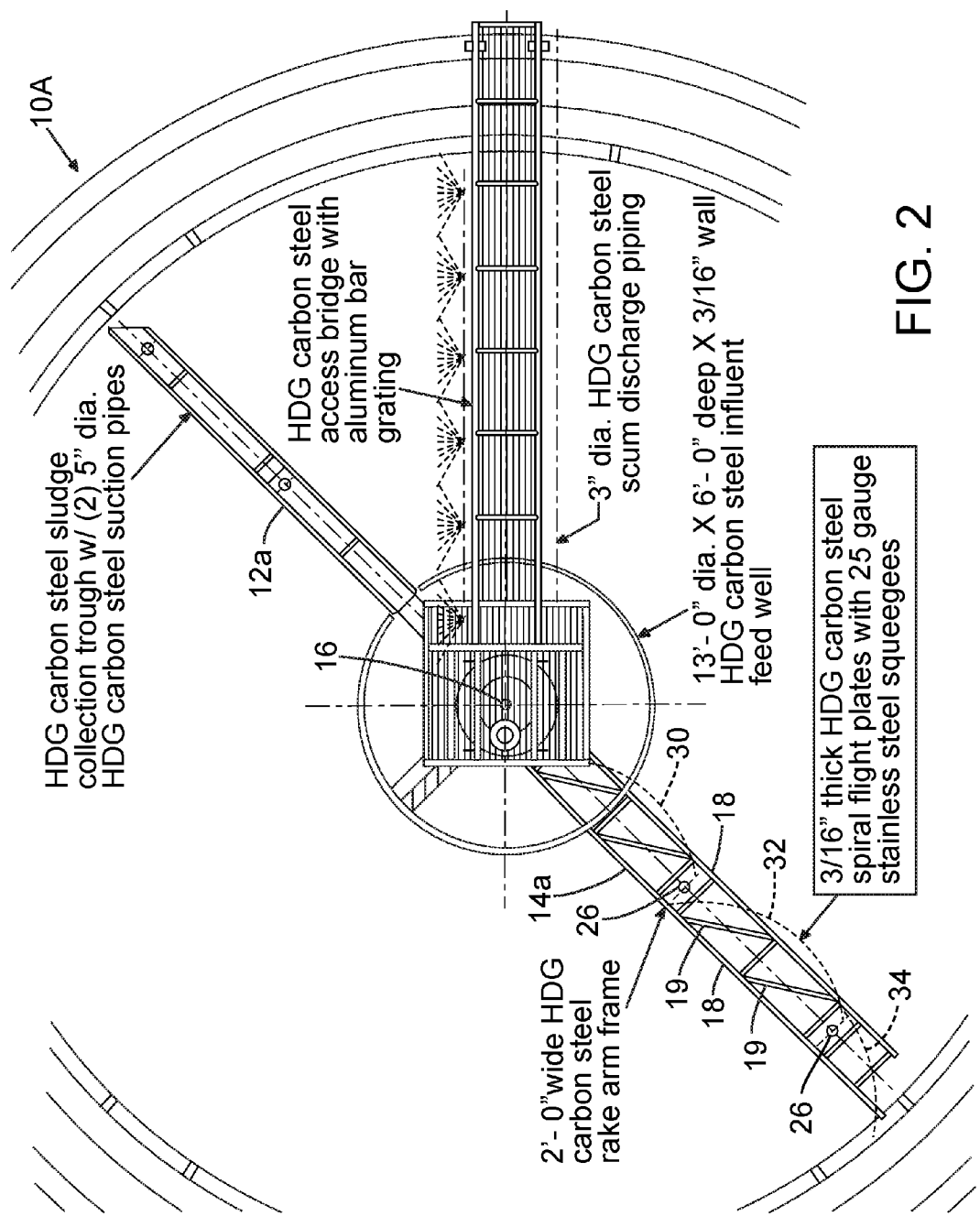
FIG. 2 is a plan view of a clarifier having the continuous blade flights of the invention.

FIG. 2 is a schematic plan view illustrating the invention, in a secondary clarifier 10a with rake arms 12a and 14a. The drawing illustrates curved, continuous blade flights at 30, 32 and 34 on the rake arm 14a, and the opposing 12a is fitted accordingly. The rake arm 14a includes structural components 18 and 19 that are typical and maintain the rigidity of each rake arm. The flights 30, 32 and 34 are shown in dashed lines in the drawing, and these may be arcuate or spiral in shape, i.e. of consistent or varying radius with longer radius toward the center. The continuous flights in this new design are capable of gathering settled solids across the full expanse of the flight (or the two adjacent flights in the case of 32 and 34) and feeding these solids to the location of the pickup tube 26 in a single pass. The rake arms move slowly (e.g. about eight feet per minute at outermost point), but there is some centrifugal force acting on the settled solids when swept by the rake arm flights. Thus there is some tendency for the settled solids to migrate outwardly along the rake arm. The curvature of the new flights 30-34 helps move the settled solids outwardly from the radially innermost end of the flight. Then, as the solids pass through the center region of the flight 30 or 32, centrifugal force continues to act, and the solids are pushed outwardly by newly gathered solids migrating from the inner end outwardly. This movement is aided by the withdrawal action of the pickup tube, with the hydraulic differential pulling sludge or settled solids upwardly and thus drawing them toward the pickup tube location.

As an example, the curved blade flights 30 and 32, if arcuate, can have a radius of about 7.5 feet, or a radius range of about 6.5 feet to 9 feet. If spiral, the shorter radius (steeper curvature) can be at the radially outer end where sludge is to be accumulated at and around the pickup tube 26.

The illustrated clarifier is of approximately 60 foot diameter. For larger-diameter clarifiers, preferably more pickup tubes are provided for each rake arm.

Figure 3:
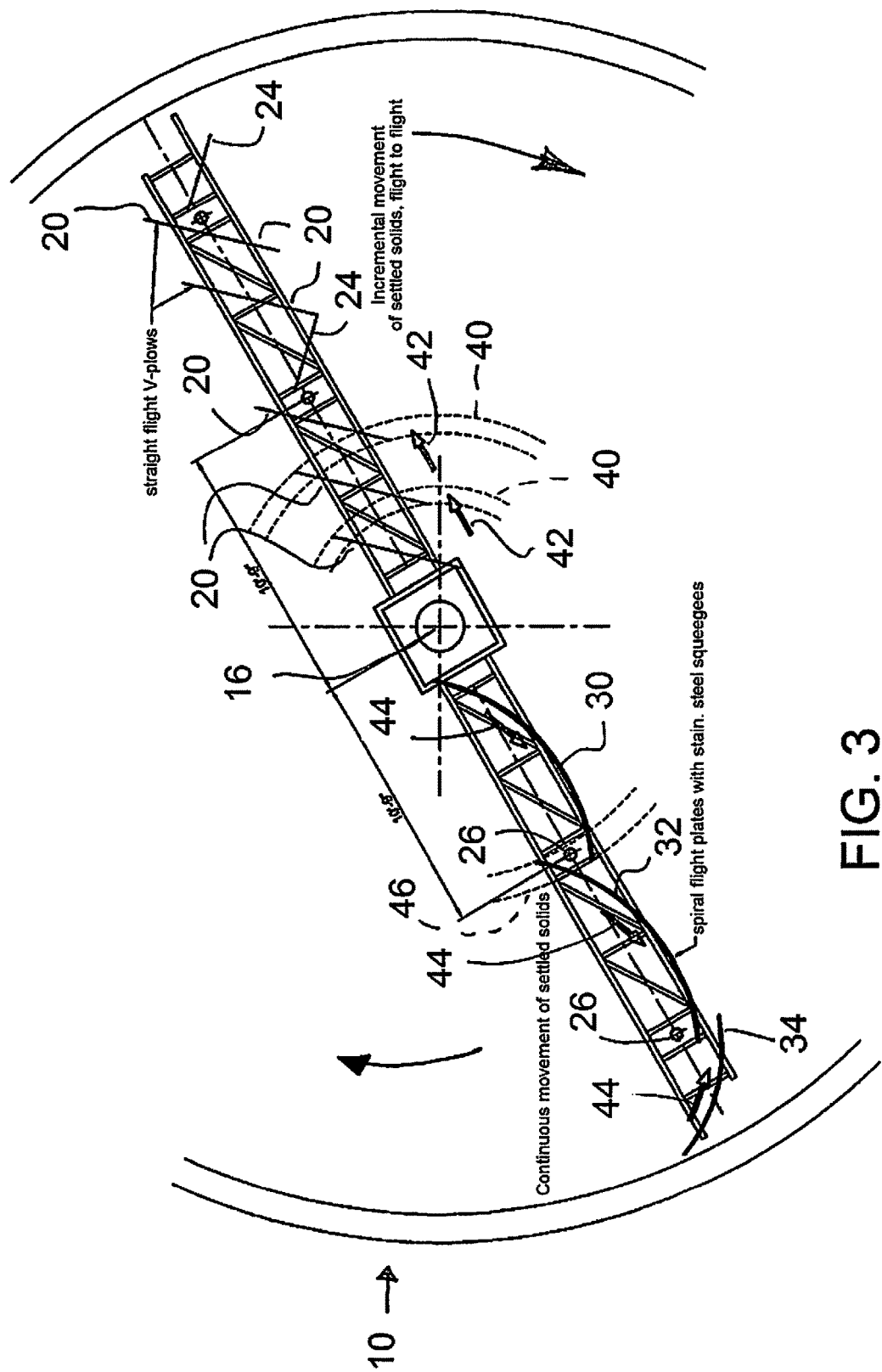
FIG. 3 is another plan view showing a portion of the clarifier and rake arms and illustrating prior art on the right and the invention on the left.

FIG. 3 is another plan view, showing schematically a portion of a clarifier 10. This drawing shows on the left the curved flights 30, 32 and 34, and for comparison, straight flights 20 and 24 on the right of the drawing, representing prior art. A clarifier would not be fitted with these two different types of flights, the drawing being only for comparison.

The drawing shows the arc of movement of the flights/squeegees around the tank floor as settled solids are moved to the nearest sludge withdrawal tube. In the conventional straight V-plow flight design (shown on the right) arcs 40 of movement are shown for ends of two of the straight flights 20. From the drawing it is seen that with each pass of a rake arm, settled solids are moved in an increment, from flight to flight, as indicated by the arrows 42.

On the left side of FIG. 3 are shown the curved flights 30, 32 and 34. Arrows 44 indicate the sliding movement of settled solids outwardly along the curved flight to the pickup tube 26, which can occur in a single pass of a rake arm, or a single revolution. The arc of movement of an inner end of a curved flight 32 is indicated at 46.

The spiral or arcuate flights 30, 32 and 34 can be, for example, 3/16 inch thick HDG carbon steel or stainless steel flight plates, with 26 gauge stainless steel squeegees at bottom.

The curved flights can be attached to the rake arms in a conventional way as has been typical with the straight flights. Preferably this attachment allows for height adjustment as in conventional straight flight connection systems. Usually the flights are adjusted to leave approximately ½ inch clearance of the squeegees from the basin floor; the squeegees do not contact the floor but are effective to move most of the sludge in the desired direction, in a sweeping effect.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a clarifier of a wastewater treatment facility, the clarifier including rake arms that rotate along the clarifier floor about a central axis of the clarifier, and including pickup tubes positioned along the rake arms for withdrawal of sludge from the clarifier floor, the improvement comprising:
   at least one rake arm having curved blade flights and squeegees on the rake arm, at least two per rake arm, each blade flight with squeegee having a curved shape that is concave toward the sludge to which the rake arm is advanced, and
   each sludge pickup tube having a pickup inlet positioned near a radially outer end of each squeegee, in a position to collect sludge gathered by the squeegee,
   whereby sludge advances radially outwardly along the rake arm under the influence of the curved blade flight and squeegee, gathering at the sludge pickup tube quickly, essentially in a single revolution of the rake arm.

2. The improvement defined in claim 1, wherein the clarifier has two opposed rake arms, each rake arm including said curved blade flights and squeegees.

3. The improvement defined in claim 1, wherein the curved blade flights and squeegees are spiral, with varying radius of curvature through the length of the squeegee.

4. The improvement defined in claim 3, wherein the varying radius is larger toward the central axis of the clarifier.

* * * * *